United States Patent

[11] 3,542,374

| [72] | Inventors | Kenneth E. Neilson |
| | | Buffalo; |
| | | Emile F. De Wilde, Hamburg, New York |
| [21] | Appl. No. | 723,798 |
| [22] | Filed | April 24, 1968 |
| [45] | Patented | Nov. 24, 1970 |
| [73] | Assignee | Worthington Corporation |
| | | Harrison, New Jersey |
| | | a corporation of Delaware |

[54] PACKING FOR PISTON RODS IN HIGH PRESSURE NON-LUBE RECIPROCATING COMPRESSORS
9 Claims, 7 Drawing Figs.

[52] U.S. Cl. ............................................. 277/22, 277/3, 277/71, 277/16
[51] Int. Cl. ............................................. F16j 15/00, F16j 15/54
[50] Field of Search ............................................. 277/22, 16, 70, 71, 75, 77, 3; 123/41.16

[56] References Cited
UNITED STATES PATENTS

| 726,953 | 5/1903 | Lentz | 277/75 |
| 1,927,507 | 9/1933 | Sommers et al. | 277/77 |
| 2,175,868 | 10/1939 | Bentley | 277/3 |
| 2,394,177 | 2/1946 | Hoern | 123/41.16 |
| 2,932,535 | 4/1960 | Peickii et al. | 277/152X |
| 3,132,568 | 5/1964 | Strader | 92/78 |
| 3,145,629 | 8/1964 | Gottzmann | 92/155 |
| 3,147,982 | 9/1964 | Klein | 277/16 |
| 3,194,568 | 7/1965 | Payne | 277/75X |
| 3,315,881 | 4/1967 | Halpin et al. | 92/155X |
| 3,334,906 | 8/1967 | Arnold | 277/3 |

*Primary Examiner*—Samuel B. Rothberg
*Attorney*—Daniel H. Bobis

ABSTRACT: A nonlube, high-pressure compressor piston rod packing is provided which incorporates means enabling the holding of the loading of individual packing rings within acceptable limits to maximize packing ring life. In addition, a plurality of cooling and/or improved heat transfer means are provided to lower packing operating temperatures and thus make the packing particularly suitable for use in high-pressure and temperature, self-lubricated compressors.

Patented Nov. 24, 1970
3,542,374
Sheet 1 of 2
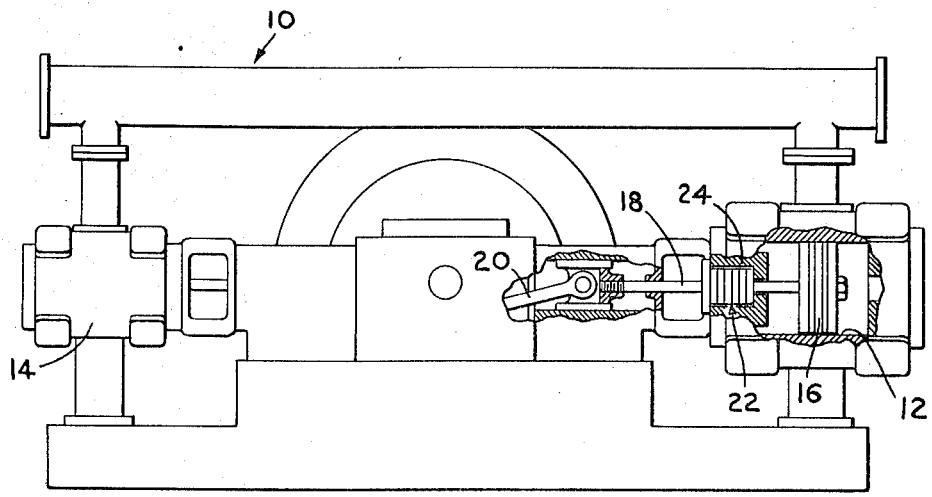
FIG. 1
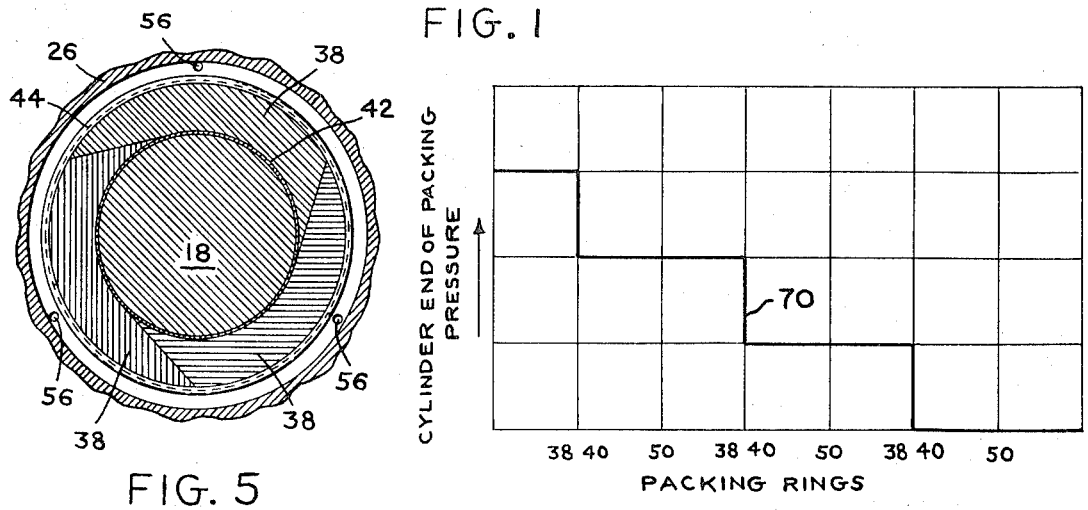
FIG. 5
FIG. 6
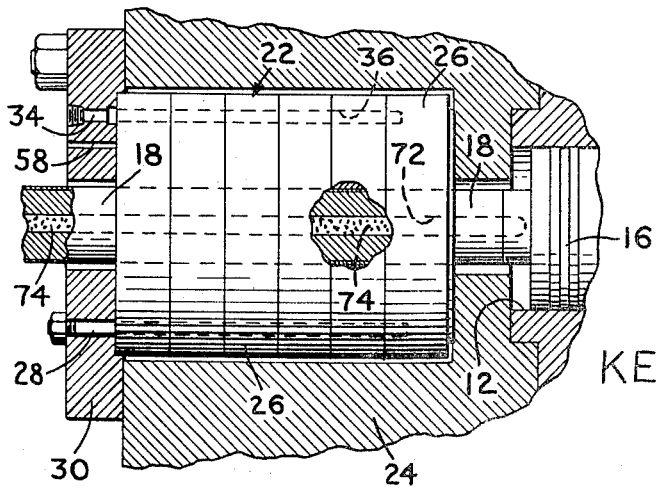
FIG. 7
KENNETH E. NEILSON
EMILE F. DE WILDE
INVENTORS
BY Daniel H. Bobis
Atty

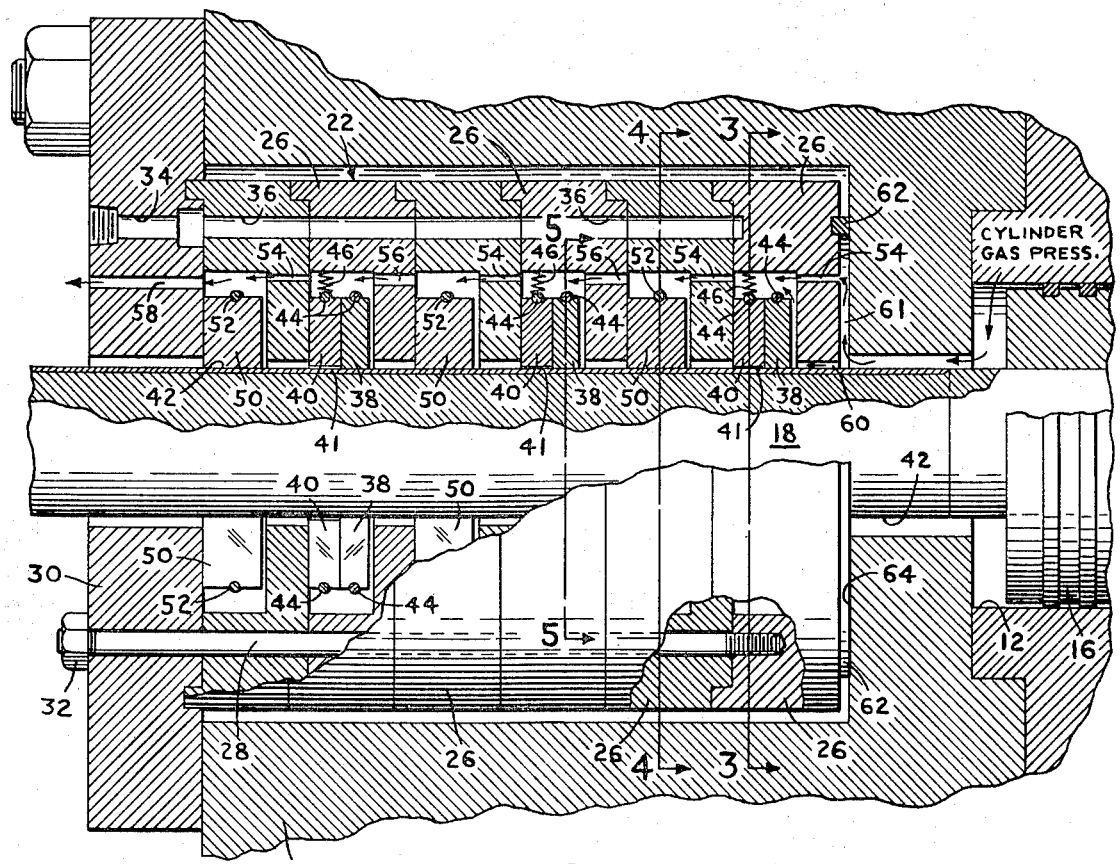
FIG. 2
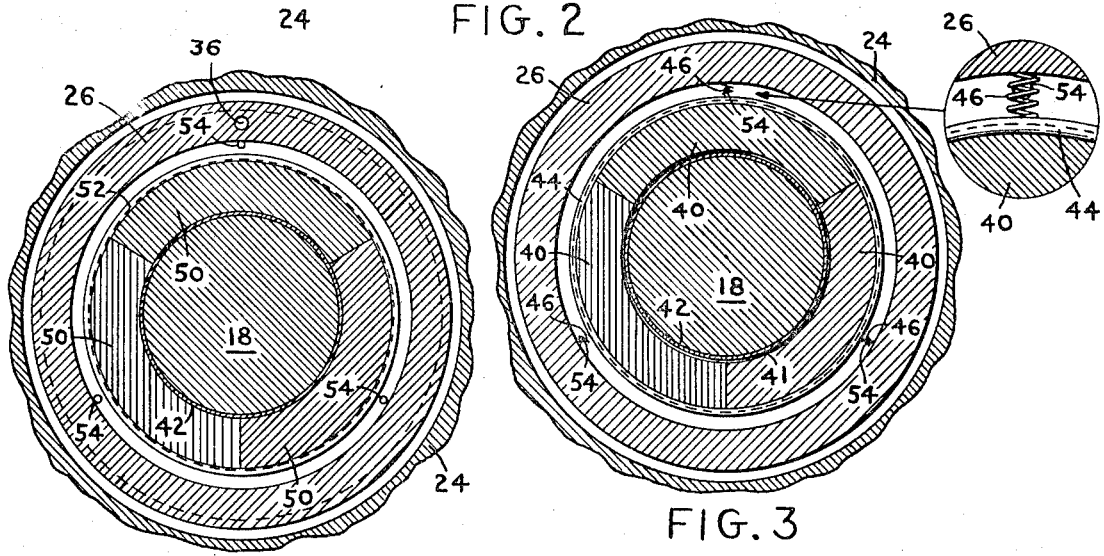
FIG. 4
FIG. 3
KENNETH E. NEILSON
EMILE F. DE WILDE
INVENTORS
BY Daniel H. Bobis
Atty

PACKING FOR PISTON RODS IN HIGH PRESSURE NON-LUBE RECIPROCATING COMPRESSORS

BRIEF DESCRIPTION OF THE INVENTION

This invention relates to an improved packing and, more particularly, to an improved, nonlube, high-pressure compressor piston rod packing for use in high-pressure and temperature, self-lubricated compressors.

An object of this invention is the provision of a nonlube, high-pressure compressor piston rod packing which incorporates means for controlling the loading of the packing rings so that the said loading may be maintained within acceptable limit.

Another object of this invention is the provision of a selflube, high-pressure piston rod compressor packing which incorporates a plurality of cooling and/or improved heat transfer means whereby packing operating temperatures, and attendant packing wear rates, are significantly reduced.

A further object of this invention is the provision of a selflube, high-pressure compressor piston rod packing which incorporates means enabling the convenient disassembly thereof, as for packing ring replacement without requiring removal of the piston rod thereof.

Briefly described, the improved, nonlube, high-pressure piston rod packing is particularly designed for use in high-pressure and temperature compressors and comprises a plurality of sealing-backup and wiper rings which cooperate with a piston rod to provide a packing-rod seal. The said rings and a surface coating of the said piston rod are of self lubricating materials whereby the use of conventional hydro-carbon lubricants is made unnecessary. In addition, means in the nature of controlled leakage orifices are provided which control the pressure drop across each of the said rings and thus control the loading thereon to thus make possible the maintenance of acceptable packing loading levels. Segmented construction is utilized for all of the packing rings to enable packing disassembly and packing ring replacement without requiring extensive compressor disassembly.

The above and other objects and advantages of this invention are believed made clear by the following detailed description thereof taken in conjunction with the accompanying drawings wherein:

FIG. 1 is a side elevational view, with a portion in section, of a high-pressure compressor showing the location therein of a piston rod packing constructed in accordance with the teachings of the invention;

FIG. 2 is a longitudinal cross-sectional view taken through a piston rod packing constructed in accordance with the teachings of the invention;

FIG. 3 is a cross-sectional view taken along line 3–3 in FIG. 2 and illustrating the construction of the packing backup rings;

FIG. 4 is a cross-sectional view taken along line 4–4 in FIG. 2 and illustrating the construction of the packing wiper rings;

FIG. 5 is a cross-sectional view taken along line 5–5 in FIG. 2 illustrating the construction of the packing sealing rings;

FIG. 6 is a curve of theoretical pressure drop plotted against sealing and packing ring position along the piston rod; and FIG. 7 illustrates a somewhat modified form of piston rod which includes rod cooling means therein.

Referring now to FIG. 1, a high-pressure, double acting compressor of the nonlubricated type as designed, manufactured and marketed by applicant's assignee, the Worthington Corporation of Harrison, N.J., is indicated generally at 10 and comprises cylinders 12 and 14 with a piston 16 being reciprocable, in conventional manner, in cylinder 12. A piston rod 18 extends as shown from piston 16 into connection with connecting rod 20. A high-pressure, nonlube rod packing constructed in accordance with the teachings of this invention is indicated generally at 22 and may be seen to be positioned around the piston rod 18 at the location where the latter extends through the cylinder casing or head 24 to provide a seal and thus make possible the compression of air within cylinder 12 by piston 16 as should be obvious.

Referring now to the more detailed showing of the packing 22 of the invention in FIG. 2, the same comprises a plurality of cup members 26, shaped as shown and maintained in the depicted, side-by-side relationships thereof by thru bolts 28 which extend therethrough and through a packing case flange 30, and are secured to the latter as indicated at 32.

Alined, cooling medium flow passages 34 and 36 are provided to extend as shown through the packing case flange 30 and the respective cup members 26 to enable the supply of a cooling medium, such as water, to the packing of the invention. Preferably, the material from which the packing flange 30 and the respective cup members 26 are made exhibits good thermal conductivity and high resistance to corrosion in the manner of stainless steel, aluminum or bronze.

A plurality of sealing ring means, each of which comprises a sealing ring 38 and a backup ring 40, disposed in the depicted side-by-side relationship, are positioned as shown for longitudinal support from alternate of the cup members 26. The respective radially inner surfaces of each of the said sealing and backup rings are in firm surface contact with a thin, self-lubricating molybdenum coating 42 provided on the surface of the piston rod 18. The primary purpose of this thin molybdenum coating 42 is to materially reduce the possibility of piston rod scoring under the effects of high pressure, high temperature compressor operation and to provide for significantly better removal of the heat generated by the piston rod-ring frictional contact.

Each of the packing backup rings 40 may be of the segmented, radially cut construction illustrated in FIG. 3, and each of the packing sealing rings 38 may be of the segmented, tangentially cut construction illustrated in FIG. 5. Each of the said sealing and backup rings is held compressed around the piston rod 18 by a garter spring 44, and each of the said backup rings is additionally centered on the piston rod 18 by a plurality of spaced, centering springs 46 which extend thereto as best seen in FIG. 3 from a spaced, opposed cup member surface. It is to be understood that the segmentation of the respective sealing and backup rings will enable the convenient replacement thereof upon disassembly of the cup member 26 without requiring removal of the piston rod 18 from the compressor 10. The respective backup rings 40 are dimensioned so that contact between the respective radially cut faces thereof will prevent the backup rings from contacting the surface of the rod coating 42, but rather, will provide a slight clearance therebetween as indicated at 41 in FIGS. 2 and 3. Preferably, though not necessarily, the dimension of the clearance 41 will range from 10 to 18 thousandths of an inch.

The respective sealing rings 38 and backup rings 40 are preferably each of a self-lubricating material with good wear characteristics, as for example, bronze filled Teflon, with the respective backup rings 40 being positioned as depicted on the downstream sides of the respective sealing rings 38 to prevent extrusion of the latter during high-pressure, high-temperature operation of the compressor 10.

In addition to the sealing rings 38 and the backup rings 40, the high-pressure piston rod packing 22 of the invention may be seen to comprise a plurality of wiper rings 50, there being one such wiper ring for each pair of sealing and backup rings. The wiper rings 50 are also supported longitudinally as shown from an adjacent surface of a cup member 26 and are also each of segmented construction, as made clear by FIG. 4. A garter spring 52 is utilized in each instance to maintain the wiper ring compressed around the piston rod 18.

Each of the wiper rings 50 is preferably of a nonlube material with reasonably good wear characteristics, as for example molybdenum disulfide ($MoS_2$) with a suitable binder material to hold the ring form, and the primary purpose of the wiper rings 50 is to apply dry lubricant $MoS_2$ to the piston rod 18 and thus reduce the frictional wear of the sealing rings 38 and backup rings 40 caused by the sliding contact of the latter with the said piston rod.

A plurality of alined controlled leakage orifices 54 and 56 are provided as shown in alternate of the cup members 26, with the entire alined orifice plurality in turn being in alinement with pressure relief orifices 58 formed as shown in the packing flange 30. In addition, controlled leakage spaces 60 and 61 are provided at the high-pressure side of the packing 22 by the space between the last cup member 26 and the piston rod coating 42, and by spacer means 62 which space the last cup member 26 from the adjacent wall 64 of the cylinder head assembly 24. Thus is believed made clear whereby controlled leakage flow passages are provided by spaces 60 and 61, alined orifices 54 and 56, and pressure relief orifices 58 to enable the controlled leakage of high-pressure fluid from within cylinder 12 to without the packing 22.

The provision of the controlled leakage orifices 54 and 56, and the resultant controlled leakage flow passage as discussed above, enables the control of the pressure drop across each of the respective sealing, backup, and wiper rings.

More specifically, it may be understood that through proper selection of the size of each of the orifices 54, and the number of sealing rings utilized in the packing of the invention, the pressure drop across each of the sealing rings can be held down to a level which will guarantee low ring wear rates. This is so because, as is believed well known to those skilled in this art, each ring wear rate is directly proportional to the pressure drop across the said ring since the pressure drop determines the ring-piston rod contact pressure and the frictional force with which the said ring seals against the piston rod. Thus, proper selection of the size of the respective controlled leakage orifices 54 will provide an acceptable pressure drop across the respective sealing rings to prevent any unduly high, sealing ring pressure drops which could result in sealing ring extrusion and/or the development of unduly high ring temperatures with attendant unduly high, sealing ring wear rates. Too, the provision of the controlled leakage orifices 54 will enable the accurate prediction of sealing ring wear rates, whereby the operational life of the sealing rings may be stipulated upon delivery of the compressor to enable the convenient establishment of optimum sealing ring replacement schedules.

With regard to the respective sizes of the orifices 56 it may of course be noted that the same are, in each instance, made much larger than the orifices 54. More specifically, the respective orifices 56 are each made large enough to substantially prevent any pressure drop across the wiper ring 50 disposed just upstream thereof thus substantially insuring that the only inward forces or ring-piston rod contact forces developed on the respective wiper rings 50 are those developed by the respective garter springs 52, the extent of which can, of course, be readily chosen to result in acceptable wiper ring wear rates. No problem is presented by substantially insuring the absence of any pressure drop across the respective wiper rings 50 since the same do not perform any sealing function, but rather, function to apply dry lubricant Mo $S_2$ to the piston rod 18 for purposes described in detail hereinabove.

In operation as the piston 16 is moved toward the packing 22 as seen in FIG. 2 to compress air in the cylinder 12, the respective sealing, backup and wiper rings will function as described above to substantially seal the piston rod and maintain a self-lubricating coating thereon. In addition, a small, controlled amount of the air being compressed will be enabled to leak, as indicated by the arrows in FIG. 2, from the cylinder 12 through spaces 60 and 61, and the controlled leakage orifices 54 and 56, to and through the pressure relief orifices 58 in the packing flange 30.

This controlled leakage of the air being compressed will maintain the pressure drops across the respective sealing rings at substantially the same level and, as discussed in detail hereinabove, at a level which is predetermined to result in minumum ring wear and attendant maximum ring life. In addition, the controlled leakage of the compressed air through enlarged orifices 56 will substantially prevent the development of pressure drops across the respective wiper rings 50 and thus insure maximum life of the latter, again as discussed in detail hereinabove.

The substantial equality of the pressure drops across the respective sealing and backup ring pairs 38 and 40, and the substantial absence of any pressure drop across the respective wiper rings 50 are believed made clear by curve 70 of FIG. 6 wherein are illustrated the theoretical pressure drops as would occur across the ring sets in a piston rod packing constructed in accordance with the teachings of the invention and utilizing three sets of sealing, backup and wiper rings respectively.

FIG. 7 illustrates a further cooling means which could be utilized to maintain packing temperatures at acceptable levels and would be particularly useful in applications relating to very high pressure and temperature, nonlubricated compressors. Thus, as seen in the subject FIG., a cavity 72 is formed in the piston rod 18 and substantially filled with material 74 having excellent heat transfer characteristics at elevated temperatures, as for example potassium. Thus, the heat transfer characteristics of the piston rod 18 would be significantly improved whereby a significantly greater amount of heat could be transferred thereby from the high-temperature piston and cylinder 12 to without the packing flange 30 to thus reduce the operating temperatures of the packing 22 and prolong the operational life thereof.

It will be understood that the invention is not to be limited to the specific construction or arrangement of parts shown but that they may be widely modified within the invention defined by the claims.

We claim:

1. In a nonlube piston rod packing for use in a compressor having a piston and a compression space:
   a plurality of spaced, sealing ring means of self-lubricating material cooperatively associated with said piston rod to seal the latter;
   means for placing said compression space in fluid flow communication with said packing and for enabling the controlled leakage of pressure fluid from said compression space past each of said sealing ring means to enable the control of the pressure drop across each of said sealing ring means and accordingly the control of the contact pressure and the frictional force with which each of said sealing ring means seals against said piston rod;
   a plurality of spaced, wiper ring means of self-lubricating material alternately spaced with respect to said sealing ring means and in wiping association with said piston rod to continually apply a self-lubricating material thereto; and
   means for enabling controlled leakage of pressure fluid from said compression space past said wiper rings to substantially prevent the occurrence of a pressure drop across the latter.

2. In a nonlube piston rod packing as in claim 1 further comprising: a coating of self-lubricating material on said piston rod for cooperation with said sealing ring means to dissipate heat away from the sealing ring means-piston rod contact area and prevent scoring of said piston rod.

3. In a nonlube piston rod packing as in claim 1 wherein: said sealing ring means each comprise a sealing ring and a backup ring disposed in side-by-side relationship, with said backup ring being disposed downstream of said sealing ring, with regard to the direction of flow of said pressure fluid, to prevent the extrusion of said sealing ring under the action of said piston rod.

4. In a nonlube piston rod packing as in claim 2 wherein: said sealing ring means each comprise a sealing ring and a backup ring disposed in side-by-side relationship, with said backup ring being disposed downstream of said sealing ring, with regard to the direction of flow of said pressure fluid, to prevent the extrusion of said sealing ring under the action of said piston rod.

5. In a nonlube piston rod packing as in claim 2 further comprising: means in said packing for enabling the circulation of a cooling fluid therethrough to reduce the operational temperature thereof.

6. In a nonlube piston rod packing as in claim 2 further comprising:
   a cavity formed in said piston rod; and
   a material having good heat transfer characteristics disposed in said cavity and operable to conduct heat away from said packing to reduce the operational temperatures thereof.

7. In a nonlube piston rod packing as in claim 6 further comprising: means in said packing for enabling the circulation of a cooling fluid therethrough to reduce the operational temperature thereof.

8. In a nonlube piston rod packing as in claim 1 wherein: said controlled leakage means are sized to provide substantially equal pressure drops across each of said sealing ring means.

9. In a nonlube piston rod packing as in claim 2 wherein: said controlled leakage means are sized to provide substantially equal pressure drops across each of said sealing ring means.